United States Patent Office 3,216,540
Patented Nov. 9, 1965

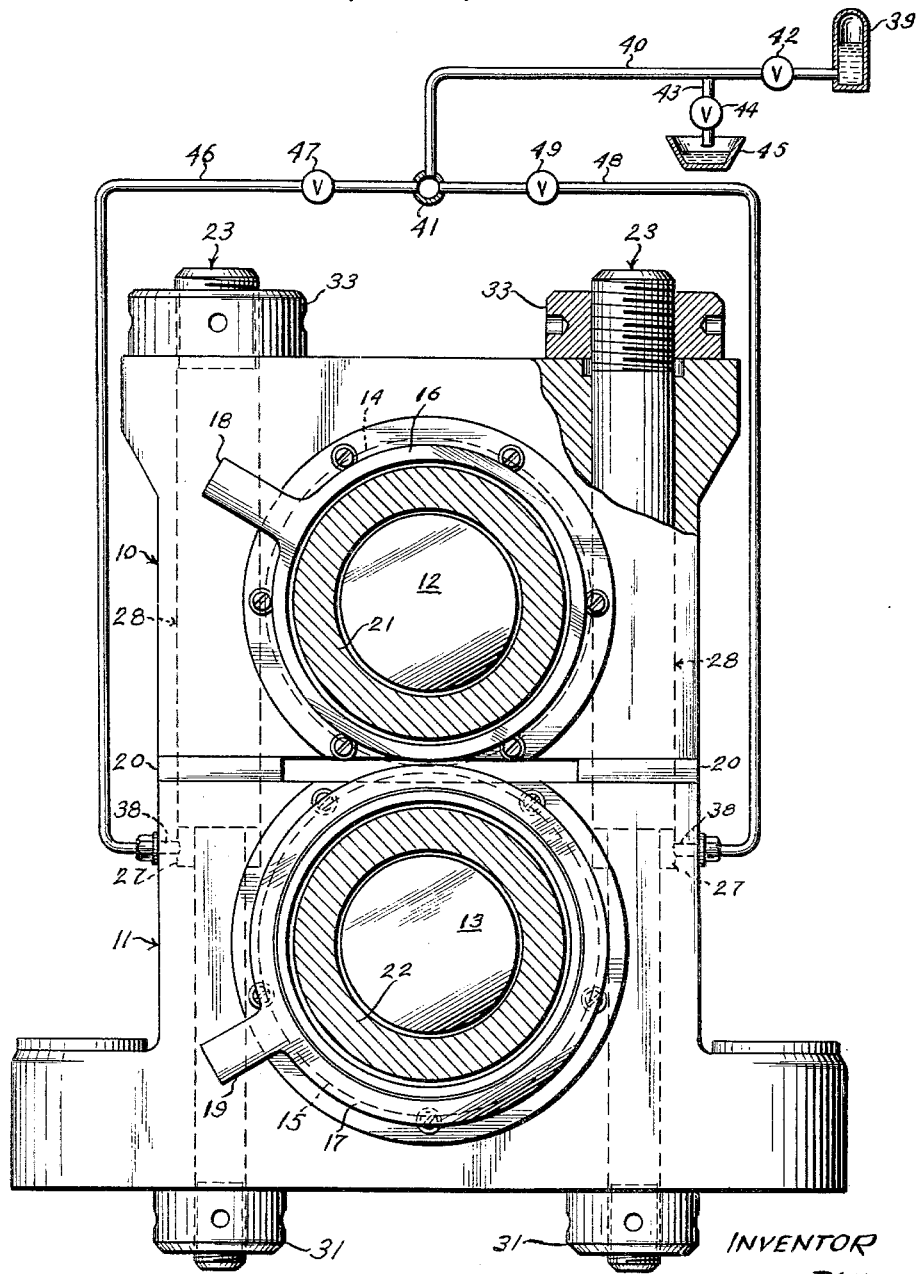

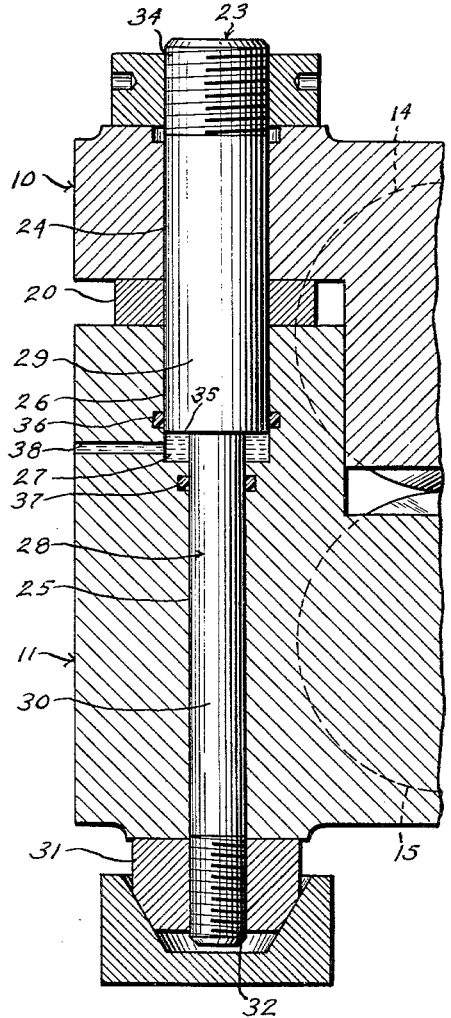

3,216,540
STAY BOLT STRUCTURE FOR INTERCONNECT-
ING STRUCTURAL PARTS
Franz Blinn, St. Ingbert, Saar, Germany, assignor to Verwaltungsgesellschaft Moeller & Neumann O.H.G., St. Ingbert, Saar, Germany
Original application Oct. 5, 1959, Ser. No. 844,229, now Patent No. 3,130,628, dated Apr. 28, 1964. Divided and this application Feb. 28, 1964, Ser. No. 350,630
5 Claims. (Cl. 189—36)

This invention relates to the interconnection of structural parts and more particularly to a stay bolt structure for interconnecting such parts, this structure including hydraulic means for elongating the stay bolt and this application is a division of my co-pending application Serial No. 844,229, filed October 5, 1959, now Patent 3,130,628.

While the stay bolt structure of this invention is of general utility, the same is primarily intended for interconnecting the roll mounts of frameless rolling mills and for purposes of illustration and not by way of limitation, the invention will be described in connection with a frameless rolling mill.

Various types of stay bolt structure have heretofore been utilized for interconnecting the roll mounts of frameless rolling mills and for other purposes and such stay bolts have also included hydraulic means for elongating the same in order to permit convenient adjustment and this invention constitutes an improvement over the presently known types of stay bolt structure incorporating hydraulic means for elongating the same.

It is accordingly an object of the invention to provide a stay bolt structure for interconnecting structural parts and including hydraulic means for elongating the stay bolt to facilitate the making of adjustments.

A further object of the invention is the provision of a stay bolt structure for interconnecting structural parts and including hydraulic means for elongating the stay bolt, such stay bolt structure including a single bolt member extending to the parts to be interconnected and with a portion of the hydraulic means being incorporated in one of the interconnected parts.

A still further object of the invention is the provision of a stay bolt structure for interconnecting structural parts, such stay bolt structure including a single one-piece bolt extending through the parts to be inter-connected with an abutment on one end of the bolt engaging one of the parts and with an adjustable nut on the other end of the bolt engaging the other part and including hydraulic means for elongating the bolt to permit free movement of one of the parts and adjustment of the nut on the bolt with respect thereto.

Further objects and advantages of the invention will be apparent from the following description taken in conjunction with the accompanying drawing wherein:

FIG. 1 is a side elevational view with parts broken away and in section for greater clarity and showing a frameless rolling mill incorporating the interconnecting stay bolt structure of this invention; and FIG. 2 is a fragmentary sectional view showing in detail the stay bolt structure structure of this invention.

With continued reference to the drawings and particularly FIG. 1, there is shown a more or less conventional frameless type rolling mill which includes upper and lower roll mounts 10 and 11 respectively. Such roll mounts serve to receive and rotatably mount the necks 12 and 13 of rolls 14 and 15. It is, of course, understood that similar roll mounting structure is provided at the opposite ends of the rolls 14 and 15.

The roll necks 12 and 13 are received in suitable roller bearings, not shown, which in turn are mounted in eccentric bearing blocks 16 and 17 which are provided with arms 18 and 19 for permitting convenient adjustment thereof to provide a fine adjustment between the rolls 14 and 15. Coarse adjustment of the rolls 14 and 15 is provided by spacers 20 disposed between the upper and lower roll mounts 10 and 11 and spacers 20 of different thicknesses may be provided for varying the spacing between the rolls 14 and 15. Boxes 21 and 22 are fixed to the roll necks 12 and 13 respectively and such boxes 21 and 22 serve to receive the spindle heads of the roll drive, not shown.

Upper and lower roll mounts 10 and 11 are interconnected by stay bolt structure 23 and in a mill of the type shown in FIG. 1 it will be understood that four stay bolts 23 are provided for interconnecting the upper and lower frame mounts. The stay bolt structure 23 forms the subject matter of this invention and as shown in FIG. 2, the upper roll mount 10 is provided with a bore 24 in alignment with a bore 25 in the lower roll mount 11 and a counterbore 26 is provided in the upper portion of the lower roll mount 11. It is to be noted that the diameter of the counter-bore 26 is the same as the diameter of bore 24 in the upper roll mount 10. It is to be noted that the counter-bore 26 provides a recess 27 opening upwardly toward the upper roll mount 10.

The stay bolt structure includes an elongated bolt member 28 having a portion 29 of enlarged diameter extending through the bore 24 in the upper roll mount 10, through the spacer 20 and slidably received in the counterbore 26 and a portion 30 of small diameter extends through the bore 25 in the lower roll mount 11. An abutment 31 is fixed to the lower end of the small diameter portion 30 of the bolt 28 and the abutment 31 engages the lower surface of the lower roll mount 11. While the abutment 31 is shown in the drawing as constituting a nut threadedly received on the threaded end 32 of the lower end of the bolt 28, the abutment 31 may be secured to the bolt 28 in any desired manner. An adjusting nut 33 is threadedly received on the upper end 34 of the enlarged portion 29 of the bolt 28 and the adjusting nut 33 engages the upper surface of the upper roll mount 10.

As clearly shown in FIG. 2, the enlarged portion 29 of the bolt 28 terminates in a shoulder 35 within the counterbore 26 and the shoulder 35 provides a piston disposed in the recess 27. Suitable sealing means in the form of packing 36 is provided for engaging the enlarged portion 29 of the bolt 28 and a similar suitable sealing means in the form of a packing 37 is provided for engaging the small diameter portion 30 of the bolt 28. A passage 38 is provided in the lower roll mount 11 communicating with the recess 27 and the passage 38 serves to conduct pressure fluid to the recess 27 in a manner to be presently described.

Again referring to FIG. 1, a suitable pressure fluid accumulator 39 may be connected through a conduit 40 to a manifold 41. A control valve 42 may be provided in the conduit 40 and between the control valve 42 and the manifold 41 a vent pipe 43 having a valve 44 therein may be connected to the conduit 40 and the vent pipe 43 may be discharged into a suitable fluid receiving sump 45. The manifold 41 may be connected through a conduit 46 having a valve 47 therein to one recess 27 in the lower roll mount 11 and the manifold 41 may also be connected through another conduit 48 having a valve 49 therein to the other recess 27 in the lower roll mount 11. It is to be understood that the manifold 41 may also be connected to the recesses 27 in the lower roll mount at the opposite end of the rolls in a similar manner to that described above.

When it is desired to elongate all of the stay bolts simultaneously the valves 47 and 49 are opened, the vent valve 44 closed and the valve 42 opened to admit pressure fluid from the accumulator 39 to the conduit 40 whereupon such pressure fluid will flow through the manifold 41 and the conduits 46 and 48 to the recesses 27 to act upon the piston formed by the shoulder 35 on the enlarged portion 29 of the bolt 28 which will serve to stretch the small diameter portion 30 of the bolt 28 thereby raising the adjusting nut 33 above the upper surface of the upper roll mount 10 to permit convenient adjustment of the nut 33 or in the event work has become jammed between the rolls 14 and 15, the same may be removed. Upon completion of the adjusting operation or the removal of jammed work, the valve 42 may be closed and the vent valve 44 opened to relieve pressure in the recesses 27 thereby permitting the bolt 28 to contract which will move the nut 33 into engagement with the upper surface of the upper roll mount 10. Obviously, the pressure fluid circuit shown in FIG. 1 may be operated to elongate any one or any combination of the stay bolts provided and the stay bolt structure as described above is obviously extremely simple, in that only a single solid bolt member is necessary and as described above, such bolt structure may be operated to completely relieve clamping pressure from the upper roll mount 10.

It will, therefore, be seen that by the above described invention there has been provided a relatively simple, yet highly effective stay bolt structure for interconnecting structural parts, such as the upper and lower roll mounts of a rolling mill and in view of the extreme simplicity of the stay bolt structure, the same may be provided at a relatively low cost.

It will be obvious to those skilled in the art that various changes may be made in the invention without departing from the spirit and scope thereof and therefore the invention is not limited by that which is shown in the drawings and described in the specification, but only as indicated in the appended claims.

What is claimed is:

1. A tensioning arrangement for a stay bolt structure interconnecting structural parts having aligned bores extending therethrough, one of said parts having a counterbore providing a recess opening toward the other part, an elongated bolt member having a portion of enlarged diameter extending through the bore in said other part and slidably received in said recess and a portion of small diameter extending through the bore in said one part, an abutment on said small diameter portion engaging said one part, a nut threadedly received on said enlarged diameter portion engaging said other part, said portion of enlarged diameter terminating in a shoulder within said recess to provide a piston, sealing means engaging said portion of enlarged diameter, sealing means engaging said portion of small diameter and a passage in said one part communicating with said recess adjacent the inner end thereof for conducting pressure fluid thereto, whereby upon the introduction of pressure fluid to said recess a force will be exerted on said piston to stretch said bolt member, thereby relieving the interconnecting force on said parts and permitting free adjustment of said nut on said bolt member.

2. A tensioning arrangement for a stay bolt structure as defined in claim 1, in which said abutment comprises a nut threadedly received on the small diameter portion of said bolt member.

3. A tensioning arrangement for a stay bolt structure interconnecting structural parts having aligned bores extending therethrough, one of said parts having a counterbore providing a recess opening toward the other part, an elongated bolt member having a portion of enlarged diameter extending through the bore in said other part and slidably received in said recess and a portion of small diameter extending through the bore in said one part, an abutment on said small diameter portion engaging said one part, a nut threadedly received on said enlarged diameter portion engaging said other part, said portion of enlarged diameter terminating in a shoulder within said recess to provide a piston and a passage in said one part communicating with said recess adjacent the inner end thereof for conducting pressure fluid thereto whereby upon the introduction of pressure fluid to said recess a force will be exerted on said piston to stretch said bolt member, thereby relieving the interconnecting force on said parts and permitting free adjustment of said nut on said bolt member.

4. A tensioning arrangement for a stay bolt structure interconnecting structural parts having aligned bores extending therethrough, one of said parts having a counterbore providing a recess opening toward the other part, an elongated bolt member having a portion of enlarged diameter extending through the bore in said other part and slidably received in said recess and a portion of small diameter extending through the bore in said one part, means connecting said small diameter portion to said one part, a nut threadedly received on said enlarged diameter portion engaging said other part, said portion of enlarged diameter terminating in a shoulder within said recess to provide a piston and a passage in said one part communicating with said recess adjacent the inner end thereof for conducting pressure fluid thereto, whereby upon the introduction of pressure fluid to said recess a force will be exerted on said piston to stretch said bolt member, thereby relieving the interconnecting force on said parts and permitting free adjustment of said nut on said bolt member.

5. A tensioning arrangement for a stay bolt structure interconnecting structural parts having aligned bores extending therethrough, one of said parts having a counterbore providing a recess opening toward the other part, an elongated bolt member having a portion of enlarged diameter extending through the bore in said other part and slidably received in said recess and a portion of small diameter extending through the bore in said one part, means connecting said small diameter portion to said one part, means on said enlarged diameter portion engaging said other part, said portion of enlarged diameter terminating in a shoulder within said recess to provide a piston and a passage in said one part communicating with said recess adjacent the inner end thereof for conducting pressure fluid thereto, whereby upon the introduction of pressure fluid to said recess a force will be exerted on said piston to stretch said bolt member, thereby relieving the interconnecting force on said parts.

References Cited by the Examiner

UNITED STATES PATENTS 2,571,265    10/51    Leufven _____ 85—32

FOREIGN PATENTS 541,584    12/41    Great Britain.

RICHARD W. COOKE, Jr, *Primary Examiner.*

FRANK L. ABBOTT, *Examiner.*